United States Patent

Kawasaki et al.

[11] Patent Number: 5,779,016
[45] Date of Patent: Jul. 14, 1998

[54] DRIVE TRANSMISSION MECHANISM

[75] Inventors: Toyotoshi Kawasaki, Kawachinagano; Hiroyuki Ogura, Nishinomiya; Masaaki Miyano, Sakai, all of Japan

[73] Assignee: Minolta Co., Ltd., Osaka, Japan

[21] Appl. No.: 735,136

[22] Filed: Oct. 22, 1996

[30] Foreign Application Priority Data

Oct. 23, 1995 [JP] Japan .................... 7-274089

[51] Int. Cl.$^6$ ...................................... F16D 7/02
[52] U.S. Cl. .................. 192/48.92; 192/56.2; 464/40; 352/140
[58] Field of Search ............... 192/48.92, 81 C, 192/56.2, 41 S; 464/40; 352/139, 140

[56] References Cited

U.S. PATENT DOCUMENTS

| | | | |
|---|---|---|---|
| 2,242,379 | 5/1941 | Wahl | 192/81 C |
| 2,371,855 | 3/1945 | Sunderland | 192/56.2 |
| 4,437,552 | 3/1984 | Toyama | 192/49.92 X |

FOREIGN PATENT DOCUMENTS 1-283438  11/1989  Japan .

*Primary Examiner*—Richard M. Lorence
*Attorney, Agent, or Firm*—Burns, Doane, Swecker & Mathis, LLP

[57] ABSTRACT

A sliding coupling mounted between a pair of separately rotational members, including a pair of coiled springs, which realizes no rotational delay at time of reversing a rotational direction of one of the rotational members. Each coiled spring has a projecting part extending radially outwardly from one end thereof. The pair of coiled springs are frictionally mounted on an outer surface of one of the rotational members with the circular parts and the projecting parts of the coiled springs being overlapped with each other so that the winding directions of the coiled springs are opposite to each other. The other rotational member has an engaging groove with which the projecting parts of the coiled springs are engaged without a space between each projecting part and a surface forming the engaging groove of the rotational member in each rotational direction. When the rotational direction of the one rotational member is reversed, the rotational direction of the other rotational member is also reversed with no rotational delay.

8 Claims, 6 Drawing Sheets

1

DRIVE TRANSMISSION MECHANISM

BACKGROUND OF THE INVENTION

1. Field of the Invention

The present invention relates to a drive transmission mechanism, particularly relates to a frictional type of sliding joint which is used in the drive transmission mechanism, and more particularly relates to the sliding joint which is constituted by a coiled spring.

2. Description of the Related Art

Conventionally, there has been provided a drive transmission mechanism including a frictional type of sliding joint which is constituted by a coiled spring, as shown in FIG. 1. The type of sliding joint is used as a mechanism, for limiting a transmission torque, which is mounted between a driving member and a member that is driven by the driving member in order to prevent a transmission torque more than a predetermined magnitude thereof from being transmitted to the member that is driven by the driving member.

For example, such a sliding joint is used in a camera, as a part of drive transmission mechanism for driving photographing lenses therein, as shown in FIGS. 1 through 3. That is, the coiled spring of the sliding joint 1 is made of a one-piece spring member, in a form that a pair of projecting parts 1a and 1b project radially outwardly from both ends of a spiral winding part 1c.

The projecting parts 1a and 1b of the coiled spring engage one rotational member, for example, a member 2 which is on a side driven of the mechanism. More specifically, the projecting parts 1a and 1b engage an engaging groove 3 formed in the member 2 which is fixed to a gear 8 on the side driven of the mechanism.

The spiral winding part 1c of the coiled spring engages the other rotational member, for example, a member 4 which is on a driving side of the mechanism. More specifically, the spiral winding part 1c thereof engages an outer surface 4a of the rotational member 4 which is fixed to a motor shaft 6, so that the spiral winding part 1c fictionally contacts the outer surface 4a of the rotational member 4.

The coiled spring 1 is set on the rotational member 4 as follows.

That is, firstly, the coiled spring is put on the outer surface 4a of the rotational member 4 with the spiral winding part 1c of the coiled spring being biased in a direction in which it is rewound or loosened.

Next, by releasing the biasing force to rewind or loosen the spiral winding part 1c, the spiral winding part 1c thereof returns to its initial state by its elasticity and winds around the outer surface 4a of the member 4 with a predetermined clamping or fastening force.

With the construction, when the driving member 4 rotates in a counterclockwise direction as shown by an arrow 9a in FIG. 2, one of the pair of projecting parts 1a and 1b, or a first projecting part 1a, of the coiled spring 1, contacts a first surface 3a of the member 2 on the side driven of the mechanism, so that the member 2 is rotated in the counterclockwise direction.

With the condition, the other of the pair of projecting members 1a and 1b, or a second projecting part 1b, of the coiled spring 1, is away from a second surface 3b which is opposed to the first surface 3a of the member 2 with an engaging slot 3 therebetween. As a result, a space 5 forms between the second projecting part 1b of the coiled spring 1, and the second surface 3b of the member 2.

Meanwhile, when the driving member 4 rotates in a clockwise direction as shown by an arrow 9b in FIG. 3, the

2 other of the pair of projecting members 1a and 1b, or a second projecting part 1b of the coiled spring 1, contacts a second surface 3b of the member 2 on the side driven of the mechanism, so that the member 2 is rotated in the clockwise direction.

With the condition, the first projecting part 1a of the coiled spring 1, is away from the first surface 3a of the member 2. As a result, a space 5 forms between the first projecting part 1a of the coiled spring 1, and the first surface 3a of the member 2.

In this way, the space 5 forms between the first projecting part 1a of the coiled spring 1 and the first surface 3a of the member 2 on the side driven of the mechanism, or between the second projecting part 1b of the coiled spring 1 and the second surface 3b of the member 2 on the side driven of the mechanism, which causes a rotational delay corresponding to the space 5 when the rotational direction of the member 4 on the driving side of the mechanism is reversed.

The rotational delay would cause the following problem. That is, for example, in case that a rotational amount is detected on the driving side of the mechanism with respect to the sliding joint 1, and in case that an angle for stopping the member 2 on the side driven of the mechanism is controlled with respect to the sliding joint 1, the above rotational delay would cause an error in the controlling result.

Accordingly, there is a continuous effort being made on the part of manufactures to provide a sliding joint using a coiled spring in which such a space as mentioned above does not form in both rotational directions.

Generally, however, it is difficult to make the processing of the coiled spring 1 more accurate, and it is difficult to keep the angle between the projecting parts 1a and 1b of the coiled spring 1 constant at time of processing it. In order to solve the problem, the engaging slot 3 of the member 2 on the driven side of the mechanism requires to be formed with a somewhat greater width in the rotational direction so that the lack of uniformity in the angle therebetween is absorbed.

In other words, it is very difficult to construct the sliding joint so that there is no such a space 5 between the projecting part 1a of the coiled spring 1 and the first surface 3a of the member 2 on the side driven of the mechanism, or between the projecting part 1b of the coiled spring 1 and the second surface 3b of the same member 2 in the rotational directions.

Also, if the member 2 on the side driven of the mechanism is so constructed that the engaging slot 3 is made narrower in the rotational directions, and if the projecting parts 1a and 1b of the coiled spring are put in the engaging slot 3 of the member 2 on the side thereof with the spiral winding part 1c of the coiled spring being forcedly loosened or opened, there would be no space between the projecting part 1a of the coiled spring and the first surface 3a of the member 2 on the side driven of the mechanism, or between the projecting part 1b of the coiled spring 1 and the second surface 3b of the same member 2.

However, with this construction, it is difficult to set the coiled spring with respect to the member 2 on the side driven at time of assembling the drive transmission mechanism thereof, and a torque transmitted between the two members 2 and 4 may be unstable.

SUMMARY OF THE INVENTION

Therefore, one object of the present invention is to provide a drive transmission mechanism with a sliding joint which forms no space with a surface forming the engaging groove of the rotational member in the rotational direction, so that a delay of rotational transmission is avoided at time of reversing the rotational direction.

Another object of the present invention is to provide the sliding joint which is prevented from being mounted erroneously between two rotational members in the drive transmission mechanism.

In accomplishing this and other objects of the present invention, there is provided a drive transmission mechanism, comprising: a first rotational member; a first coiled spring which has a generally spiral winding part and a first engaging part which extends radially and outwardly from an end of the spiral winding part, wherein the spiral winding part of the first coiled spring is fictionally mounted on an outer surface of the first rotational member; a second coiled spring which has a generally spiral winding part and a second engaging part which extends radially and outwardly from an end of the spiral winding part, wherein the spiral winding part of the second coiled spring is fictionally mounted on the outer surface of the first rotational member so that a winding direction of the spiral winding part of the second coiled spring is opposite to a winding direction of the spiral winding part of the first coiled spring; and a second rotational member which is coaxial to the first rotational member, and which has an engaging groove that receives the first engaging part of the first coiled spring and the second engaging part of the second coiled spring with no space, between the first and second engaging parts thereof, and a surface forming the engaging groove, in a rotational direction of the first and second rotational members.

In the mechanism, the engaging groove of the second rotational member may comprise a groove which opens on one end of the second rotational member, a penetration hole extending in a radial direction the diameter of which is equal to the diameter of the engaging part of the coiled spring, and the like.

The pair of coiled springs are mounted between the first and second rotational members with the first and second engaging parts being overlapped or contacted so that a winding direction of the spiral winding part of the first coiled spring is opposite to a winding direction of the spiral winding part of the second coiled spring.

According to the mechanism, a torque or a rotational driving force that is greater than a torque or a rotational driving force corresponding to a frictional force which acts between the outer surface of the first rotational member and an inner surface of the coiled spring is not transmitted between the first and second rotational members. This is because the outer surface of the first rotational member and the inner surface of the coiled spring slide relative to each other so that the drive transmission is shut off therebetween, when such a greater torque or rotational driving force is about to be transmitted between the two rotational members. That is, the drive transmission mechanism limits the maximum transmission torque which is transmitted between the first and second rotational members.

Also, according to the mechanism, the second rotational member has the engaging groove that receives the first engaging part of the first coiled spring and the second engaging part of the second coiled spring with no space or no play, between the first and second engaging parts thereof, and a surface forming the engaging groove, in a rotational direction of the first and second rotational members, as above mentioned. Therefore, when one of the first and second rotational members is reversed in rotation, there occurs no delay of rotational transmission between the two rotational members.

Also, according to the mechanism, the first and second coiled springs are arranged so that the winding direction of the spiral winding part of the second coiled spring is opposite to the winding direction of the spiral winding part of the first coiled spring. Therefore, when the first and second rotational members rotate relative to each other, the spiral winding part of one of the rotational members is exerted on by a moment which acts in a direction in which the spiral winding part is opened or expanded in a radial or diametrical direction, while the spiral winding part of the other of the rotational members is exerted on by a moment which acts in a direction in which the spiral winding part is closed in a radial or diametrical direction. As a result, the biassing force of the first coiled spring against the outer surface of the first rotational member is different from the biassing force of the second coiled spring against the outer surface of the first rotational member, which in turn makes different the magnitude of the frictional force between the outer surface of the first rotational member and the inner surface of the first coiled spring, from the magnitude of the frictional force between the outer surface of the first rotational member and the inner surface of the second coiled spring. On the other hand, when the relative rotation between the first and second rotational members is reversed, the relation in the above biassing force and the frictional force is reversed. With the mechanism and function, the limited transmission torque transmitted between the first and second rotational members is equal to the sum of the transmission torque corresponding to the frictional force exerting between the first rotational member and the first coiled spring, and the transmission torque corresponding to the frictional force exerting between the first rotational member and the second coiled spring. Accordingly, when the first and second coiled springs are made on the same condition, the drive transmission torque is kept constant, irrespective of the relatively rotational direction between the first and second rotational members.

Preferably, the coiled spring has an axial projecting part which extends from the other end of the spiral winding part thereof in a direction generally parallel to an axis of the rotational member.

According to the construction, when the first and second coiled springs are overlapped with the same orientation, and a tip of the axial projecting part of one of the first and second coiled springs contacts the other of the two coiled springs, the first and second projecting parts of the two coiled springs are separate from each other with an interval in the axial direction therebetween. Also, when the spiral winding parts of the two coiled springs are overlapped with the same orientation so that the tip of the axial projecting part of one of the first and second coiled springs does not contact the other of the two coiled springs, the first and second projecting parts of the two coiled springs are not overlapped to each other with an angle formed therebetween in the peripheral direction. That is, according to the construction, it is possible to judge whether the pair of coiled springs are properly mounted between the first and second rotational members in a correct orientation, or not.

The spiral winding part of the coiled spring may be generally in a form of a partial circle that is more than a half of one complete circle and is less than the one complete circle. In the construction, it is preferable that the spiral winding part of the coiled spring exists in the same plane as the first or second engaging part thereof exist. In the construction, in case that the spiral winding part of the coiled spring is generally in a form of a partial circle that is a bit more than but almost a half of one complete circle, the pair of coiled springs are mounted on the first rotational member so that the first rotational member is pinched by the pair of coiled springs from outside in one diametrical direction. Also, in case that the spiral winding part of the coiled spring is generally in a form of a partial circle that is more than ¾ of one complete circle, the pair of coiled springs are mounted on the first rotational member so that the first rotational member is pinched by the pair of coiled springs from outside in two diametrical directions generally perpendicular to each other.

Alternatively, the spiral winding part of the coiled spring may include a plurality of windings. In this case, the direction perpendicular to the winding direction of the coiled spring extends generally in the axial direction of the rotational member.

The drive transmission mechanism may be provided in a lens driving mechanism of a camera.

According to the construction, the pair of coiled springs are constituted by the same members which are made of the same material in the same shape. Consequently, the coiled spring can be easily and accurately manufactured by punching, for example, and can be easily assembled or put in between the two rotational members.

Although the above drive transmission mechanism is so constructed that the engaging part of each coiled spring projects radially outwardly from an end of the spiral winding part, the drive transmission mechanism can be so constructed that the engaging part of each coiled spring projects radially and inwardly from an end of the spiral winding part, as a modification to the above mechanism.

That is, the drive transmission mechanism comprises: a first rotational member; a first coiled spring which has a generally spiral winding part and a first engaging part which extends radially and inwardly from an end of the spiral winding part, wherein the spiral winding part of the first coiled spring is fictionally mounted on an inner surface of the first rotational member; a second coiled spring which has a generally spiral winding part and a second engaging part which extends radially and inwardly from an end of the spiral winding part, wherein the spiral winding part of the second coiled spring is fictionally mounted on the inner surface of the first rotational member so that a winding direction of the spiral winding part of the second coiled spring is opposite to a winding direction of the spiral winding part of the first coiled spring; and a second rotational member which is coaxial to the first rotational member, and which has an engaging groove that receives the first engaging part of the first coiled spring and the second engaging part of the second coiled spring with no space, between the first and second engaging parts thereof, and a surface forming the engaging groove, in a rotational direction of the first and second rotational members.

The fictionally engaging parts between the first rotational member and the coiled spring according to the latter mechanism is different from the corresponding parts according to the former mechanism.

That is, according to the latter mechanism, the inner surface of the first rotational member and the outer surface of each coiled spring are fictionally engaged with each other.

With the construction, the pair of coiled springs are mounted between the first and second rotational members with the first and second engaging parts being overlapped or contacted so that a winding direction of the spiral winding part of the first coiled spring is opposite to a winding direction of the spiral winding part of the second coiled spring.

According to the mechanism, a torque or a rotational driving force that is greater than a torque or a rotational driving force corresponding to the frictional force which acts between the inner surface of the first rotational member and the outer surface of the coiled spring is not transmitted between the first and second rotational members. This is because the inner surface of the first rotational member and the outer surface of the coiled spring slide relative to each other so that the drive transmission is shut off therebetween, when such a greater torque or rotational driving force is about to be transmitted between the two rotational members. That is, the drive transmission mechanism limits the maximum transmission torque which is transmitted between the first and second rotational members.

Also, according to the mechanism, the second rotational member has the engaging groove that receives the first engaging part of the first coiled spring and the second engaging part of the second coiled spring with no space or no play, between the first and second engaging parts thereof, and a surface forming the engaging groove, in a rotational direction of the first and second rotational members. Therefore, when one of the first and second rotational members is reversed in rotation, there occurs no delay of rotational transmission between the two rotational members.

Also, according to the mechanism, the first and second coiled springs are arranged so that the winding direction of the spiral winding part of the second coiled spring is opposite to the winding direction of the spiral winding part of the first coiled spring. Therefore, when the first and second rotational members rotate relative to each other, the spiral winding part of one of the rotational members is exerted on by a moment which acts in a direction in which the spiral winding part is opened or expanded in a radial or diametrical direction, while the spiral winding part of the other of the rotational members is exerted on by a moment which acts in a direction in which the spiral winding part is closed in a radial or diametrical direction. As a result, the biassing force of the first coiled spring against the inner surface of the first rotational member is different from the biassing force of the second coiled spring against the inner surface of the first rotational member, which in turn makes different the magnitude of the frictional force between the inner surface of the first rotational member and the outer surface of the first coiled spring, from the magnitude of the frictional force between the inner surface of the first rotational member and the outer surface of the second coiled spring. On the other hand, when the relative rotation between the first and second rotational members are reversed, the relation in the above biassing force and the frictional force is reversed. With the mechanism and function, the limited transmission torque transmitted between the first and second rotational members is equal to the sum of the transmission torque corresponding to the frictional force exerting between the first rotational member and the first coiled spring, and the transmission torque corresponding to the frictional force exerting between the first rotational member and the second coiled spring. Accordingly, when the first and second coiled springs are made on the same condition, the drive transmission torque is kept constant, irrespective of the relatively rotational direction between the first and second rotational members.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE INVENTION

Figure 1:
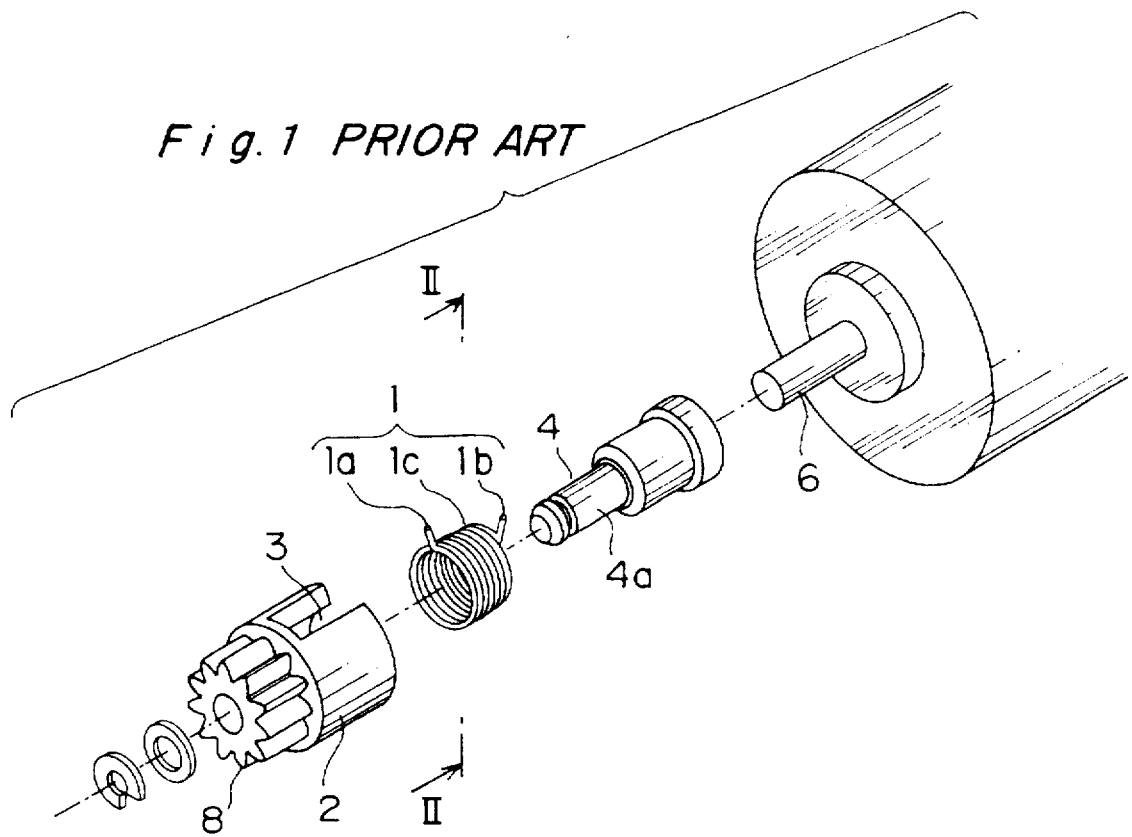
FIG. 1 is an exploded perspective view of a drive transmission mechanism including a sliding joint, which is constituted by a coiled spring, according to a prior art.
Figure 2:
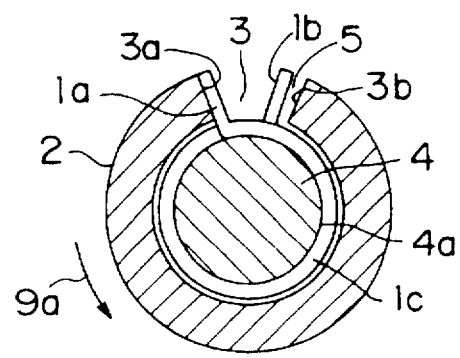
FIG. 2 is an enlarged, transverse sectional view of the drive transmission mechanism of FIG. 1 with parts thereof being assembled together, showing a condition in which the rotational members rotate in a counterclockwise direction.
Figure 3:
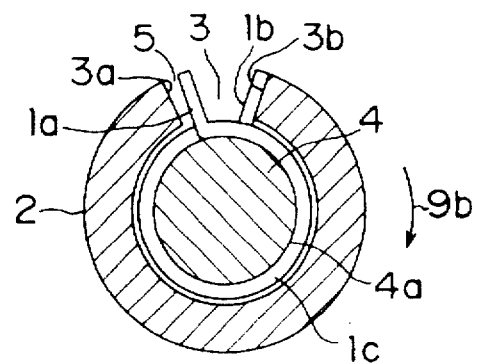
FIG. 3 is an enlarged, transversely sectional view, similar to FIG. 2, showing a condition in which the rotational members rotate in a clockwise direction.

Before the description of the present invention proceeds, it is to be noted that like or corresponding parts are designated by like reference numerals throughout the accompanying drawings.

Referring to FIGS. 4 through 14, a full description is made below on a drive transmission mechanism having a sliding joint, which is constituted by a pair of coiled springs, according to a first through a third embodiment of the present invention.

First, referring to FIGS. 4 through 9, the description is made on the drive transmission mechanism having the sliding joint according to the first embodiment of the present invention.

Figure 4:
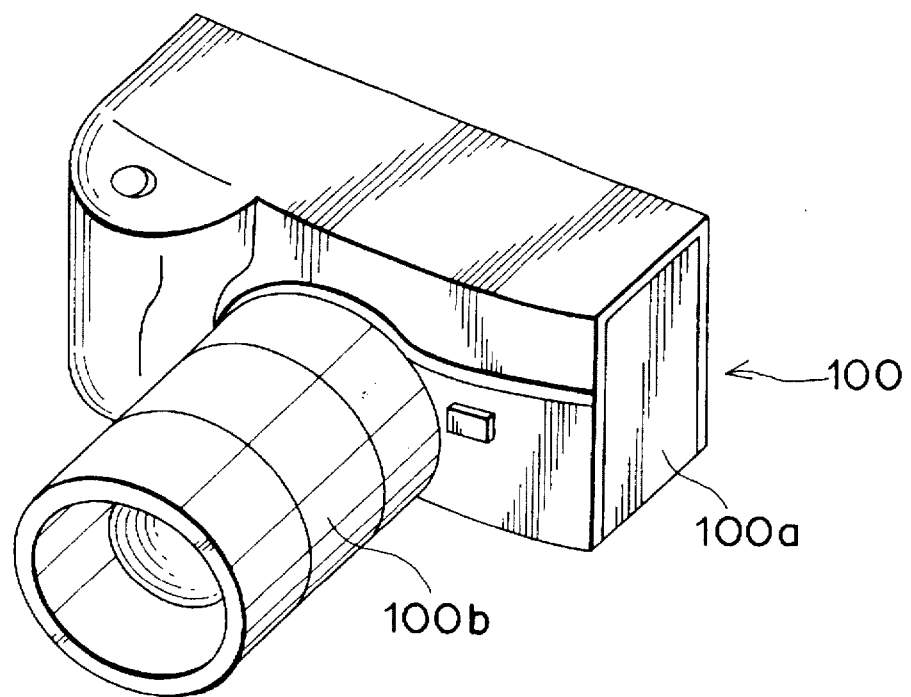
FIG. 4 is a perspective view of a camera, to which a drive transmission mechanism according to the present invention applies.
Figure 5:
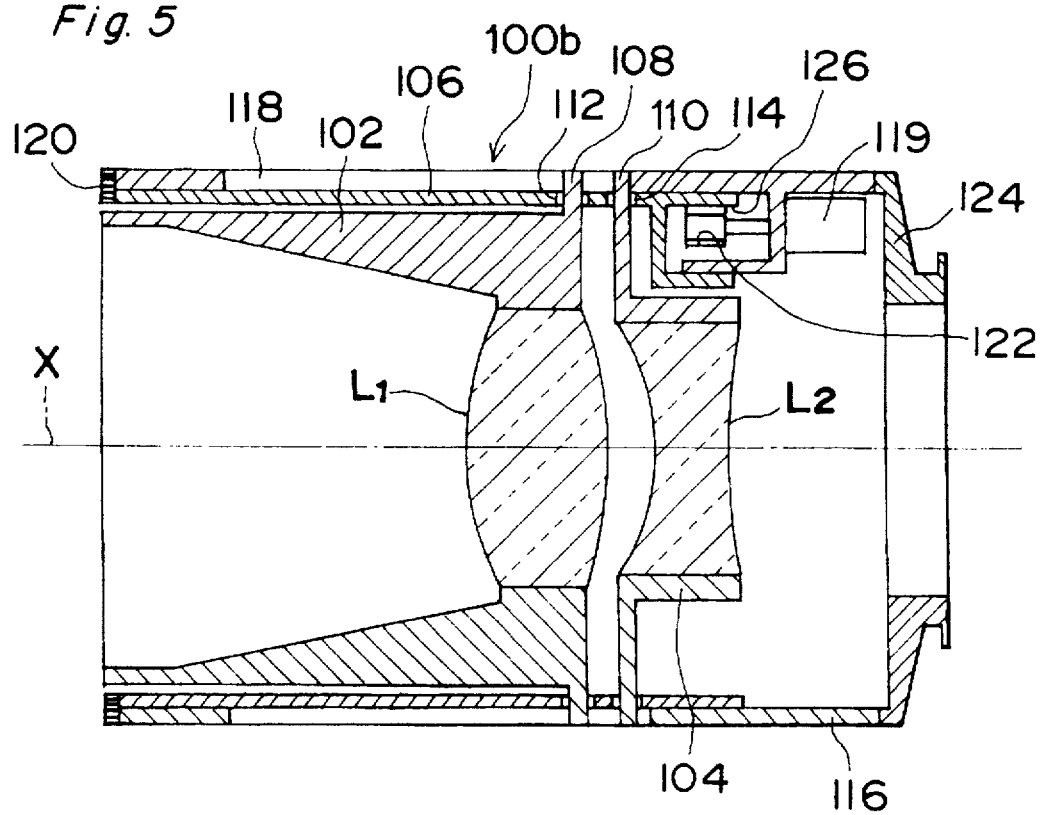
FIG. 5 is an enlarged, longitudinally sectional view of a lens barrel of the camera shown in FIG. 4.

FIG. 4 is a perspective view of a camera 100 which has a camera body 100a and a lens barrel 100b that is mounted on the camera body 100a; and FIG. 5 is an enlarged, longitudinally sectional view of the lens barrel 100b of the camera 100 shown in FIG. 4.

In FIG. 5, a reference numeral 102 points to a first moving frame provided on a front side of the lens barrel 100b; 104 to a second moving frame provided on a rear side thereof. With the first moving frame 102 and the second moving frame 104, a pair of groups of lenses L1 and L2 are supported, respectively.

In the figure, a reference numeral 106 points to a cam barrel with an inner gear 126, with which the first and second moving frames 102 and 104 are engaged from inside, and a pin 108 provided on the first moving frame 102 and a pin 110 provided on the second moving frame 104 extend through a spiral cam opening 112 and a spiral cam opening 114, respectively.

Also, in the figure, a reference numeral 116 points to a stationary barrel, and 118 to a straight cam opening which is formed in the stationary barrel 116. The cam barrel 106 is engaged with the stationary barrel 116 from inside, and the pins 108 and 110 which pass through the cam openings 112 and 114 of the cam barrel 106 further extend through the cam opening 118.

Also, a reference numeral 120 points to a stopper ring, and 119 to a motor unit in which a driving motor with a motor shaft is provided. The motor unit 119 has a driving gear 122 which engages with the inner gear 126 of the cam barrel 106 and is driven by a gear train, including a worm to which the motor shaft of the driving motor is frictionally connected and a worm wheel engaging the worm, of the motor unit 119. In other words, the driving motor with the motor shaft (not shown in the figure), the gear train including the worm and the worm wheel are provided in the motor unit 119. In the connection, a reference numeral 124 points to a cover which shields a rear side of the lens barrel of the camera.

With the mechanism, when the driving gear 122 rotates, the cam barrel 106 is driven and rotated by the driving gear 122 of the motor unit 119. Hence, the cam barrel 106 is rotated about an optical axis X so that the cam barrel 106 projects or retracts relative to the camera body 100a.

Figure 6:
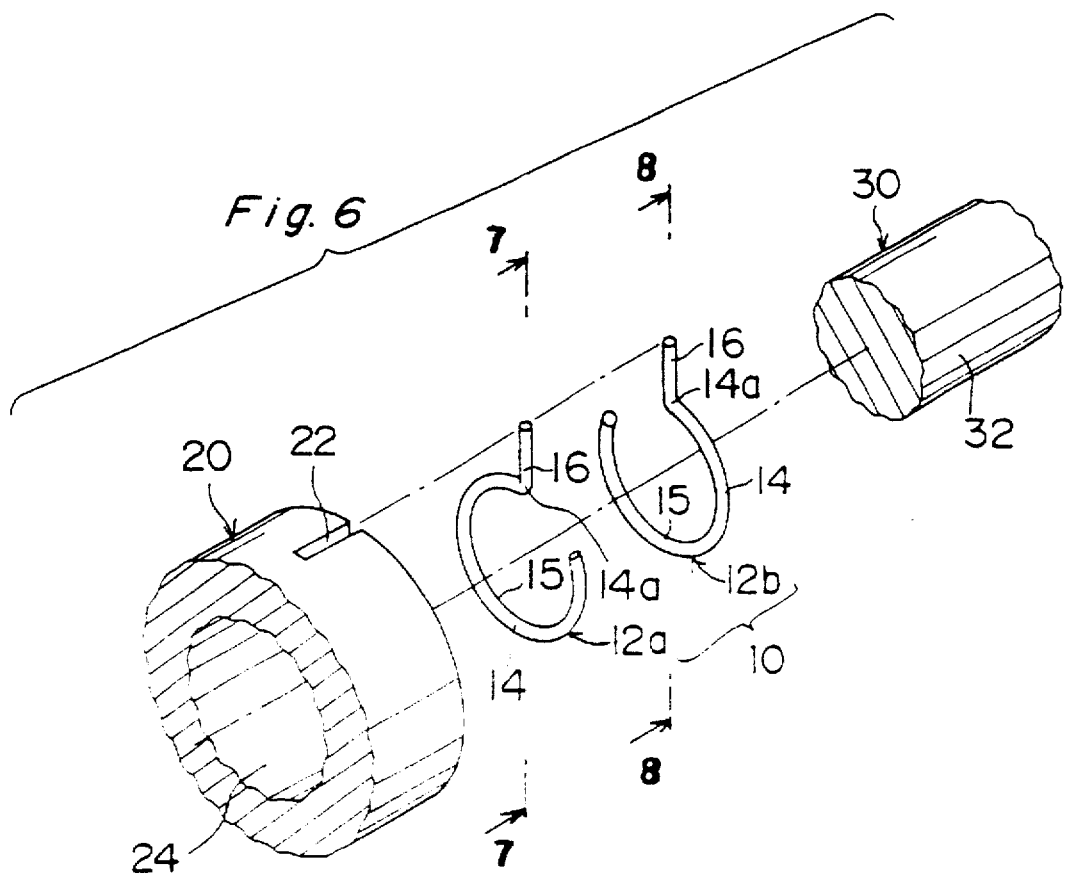
FIG. 6 is an exploded perspective view of a drive transmission mechanism having a sliding joint, which is constituted by a pair of coiled springs, according to a first embodiment of the present invention.

In the above mechanism, in order to prevent the motor from heating up or being damaged when an excessive torque or excessive outer force exerts on the motor shaft, a sliding joint 10, as shown in FIG. 6, which is constituted by a pair of coiled springs 12a and 12b, is mounted between a first rotational member 30 and a second rotational member 20. The first rotational member 30 corresponds to the motor shaft; and the second rotational member 20 corresponds to the worm in the motor unit of the camera.

In the specification, we also refer to the first rotational member 30 and the second rotational member 20 as a driving member and a member driven, respectively. As a modification to the first embodiment, it is also possible to construct the drive transmission mechanism so that the second rotational member 20 and the first rotational member 30 are a driving member and a member driven, respectively.

In the mechanism of the first embodiment, the sliding joint 10 comprises the pair of coiled spring members 12a and 12b which have the same shape and configuration. Each of the coiled springs 12a and 12b is made of one-piece spring material, and has a circular part 14 and a projecting part 16 which projects radially outwardly from an end of the circular part 14. Each of the coiled springs 12a and 12b is so formed that the circular part 14 thereof generally extends within 300° about its center. As a modification, the circular part 14 may be so constructed as to extend within 180° through 360° about its center.

In the mechanism of the first embodiment, the first rotational member 30 has an outer surface 32 which has a diameter a bit greater than an inner diameter of the circular part 14 of the coiled spring 12a or 12b. The second rotational member 20 has an inner opening 24 which has an inner diameter a bit greater than an outer diameter of the circular part 14 of the coiled spring 12a or 12b. Also, the second rotational member 20 has an engaging groove 22 the width of which is equal to the width of the projecting part 16 of the coiled spring 12a or 12b in the peripheral direction of the second rotational member 20. The engaging groove 22 of the second rotational member 22 extends through radially outwardly therein.

The coiled springs 12a and 12b are mounted on the first rotational member 30 of the drive transmission mechanism as follows.

That is, the circular part 14 of each coiled spring 12a or 12b is first expanded radially outwardly, and then the circular part 14 thereof is engaged on the outer surface 32 of the first rotational member 30, by inserting the coiled spring 12a or 12b over the first rotational member 30 in an axial direction in which the first rotational member 30 extends, or by forcibly engaging the coiled springs 12a and 12b on the outer surface 32 of the first rotational member 30 in a direction generally perpendicular to the axial direction in which the first rotational member 30 extends.

Then, the force to expand the circular part 14 of the coiled spring 12a or 12b is released. Then, the circular part 14 thereof returns to its original shape or configuration by its own elasticity so that the inner surface of the circular part 14 of the coiled spring 12a or 12b fictionally contacts the outer surface 32 of the first rotational member 30.

The coiled springs 12a and 12b are mounted on the outer surface 32 of the first rotational member 32 so that the winding directions of the circular parts 14 of the paired coiled springs 12a and 12b relative to the first rotational member 30 are opposite to each other, and so that the projecting parts 16 and 16 of the coiled springs 12a and 12b are mutually overlapped or contacted.

With the condition, the projecting parts 16 and 16 are inserted inside the engaging groove 22 of the second rotational member 20 for locking the projecting parts 16 and 16 with respect to the second rotational member 20.

When the coiled springs 12a and 12b are mounted between the first and second rotational members 30 and 20, the inner surface 15 of the circular part 14 of the coiled spring 12a or 12b fictionally contacts the outer surface 32 of the first rotational member 30 with some biasing force acting therebetween. At the same time, the projecting part 16 of the coiled spring 12a or 12b extends through the engaging groove 22 of the second rotational member 20 without any space between the projecting part 16 thereof and a surface forming the groove 22 in each rotational direction.

Figure 7:
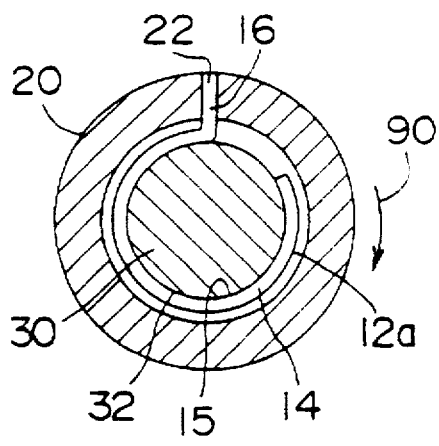
FIG. 7 is a transversely sectional view of the drive transmission mechanism of FIG. 6 with parts thereof being assembled together, showing a condition of one of the pair of coiled springs in which the rotational members rotate in a clockwise direction.
Figure 8:
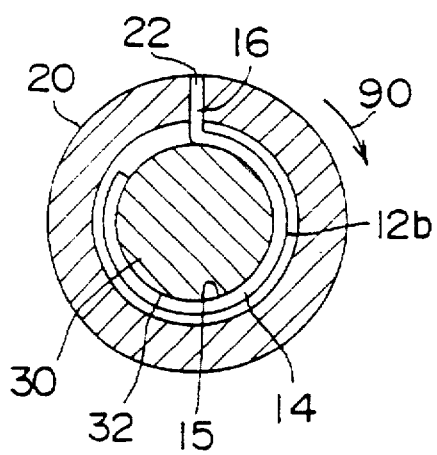
FIG. 8 is a transversely sectional view of the drive transmission mechanism, similar to FIG. 7, showing a condition of the other of the pair of coiled springs.
Figure 9:
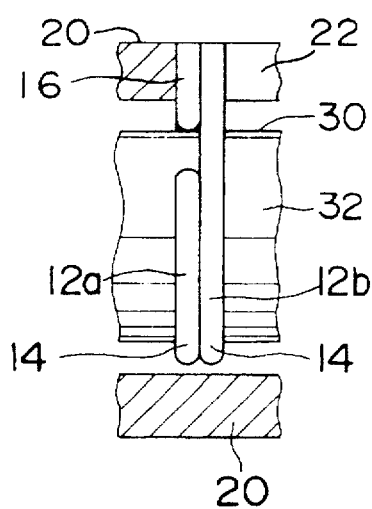
FIG. 9 is a partially broken and longitudinally sectional view of FIG. 6 with parts thereof being assembled together.

With the above mechanism, for example, when the first rotational member 30 rotates in a clockwise direction as shown by an arrow 90 in FIG. 7, the engagement of the projecting part 16 of one of the paired coiled springs 12a and 12b with the engaging groove 22 of the second rotational member 22 generates a moment to the circular part 14 thereof in such a direction as expanding or opening the circular part 14. On the other hand, when the first rotational member 30 rotates in the same direction, the engagement of the projecting part 16 of the other of the paired coiled springs 12a and 12b with the engaging groove 22 of the second rotational member 20 generates a moment to the circular part 14 thereof in such a direction as closing the circular part 14. That is, depending upon the moment which exerts on the circular part 14 of the coiled spring 12a or 12b so that the circular part 14 is opened or closed, the biasing or frictional force, exerting on the outer surface 32 of the first rotational member 30 in a diametrical direction relative thereto, of the circular part 14 of the coiled spring 12a or 12b varies. Consequently, the frictional force, exerting in the peripherally rotational direction thereof, between the inner surface 15 of the circular part 14 of one coiled spring 12a, and the outer surface 32 of the first rotational member 30 is different from the frictional force between the inner surface 15 of the circular part 14 of the other coiled spring 12b, and the outer surface 32 thereof.

When the rotational direction of the first rotational member 30 is reversed, the above relation in the frictional force between the inner surface 15 of the circular part 14, and the outer surface 32 of the first rotational member 30 is reversed.

However, the total torque exerting on the pair of coiled springs 12a and 12b is kept constant, because the total torque is just equal to the sum of the respective torques exerted on the outer surface 32 of the first rotational member 30 by the pair of coiled springs 12a and 12b, irrespective of the rotational direction of the first rotational member 30.

When the first rotational member 30 rotates and the inner surface 15 of the circular part 14 of the coiled spring 12a or 12b does not slide relatively on the outer surface 32 of the first rotational member 30, the rotation of the first rotational member 30 is transmitted to the second rotational member 20 with the projecting parts 16 and 16 of the coiled springs 12a and 12b engaging the engaging groove 22 of the second rotational member 20.

Meanwhile, when the first rotational member 30 rotates and the inner surface 15 of the circular part 14 of the sliding joint slides relatively on the outer surface 32 of the first rotational member 30, the rotation of the first rotational member 30 is not transmitted to the second rotational member 20. This is due to the following reason.

Namely, regarding the outer diameter of the first rotational member 30 as "2R", and providing that a torque T greater than a torque F×R due to the frictional force F exerting in the peripherally rotational direction between the inner surfaces 15 and 15 of the circular parts 14 and 14 of the pair of coiled springs 12a and 12b, and the outer surface 32 of the first rotational member 30, is about to be transmitted from the first rotational member 30 to the second rotational member 20, there occurs a relative sliding between the inner surfaces 15 and 15 of the circular parts 14 of the pair of coiled springs 12a and 12b, and the outer surface 32 of the first rotational member 30. As a result, such an excessive torque T is not transmitted from the first rotational member 30 to the second rotational member 20. That is, the transmission torque between the first and second rotational members 30 and 20 is limited by the coiled springs 12a and 12b functioning as a slider relative to the first rotational member 30.

When the rotation transmitted from the first rotational member 30 to the second rotational member 20 with no mutual sliding between the inner surfaces 15 and 15 of the circular parts 14 and 14 of the coiled springs 12a and 12b, and outer surface 32 of the first rotational member 30 is stopped, and then the rotation of the first rotational member 30 is reversed, the reversed rotation is transmitted to the second rotational member 20 without a rotational delay. This is because the projecting part 16 of each coiled spring 12a or 12b is surely engaged with the surface forming the engaging groove 22 of the second rotational member 20 with no space therebetween in the rotational direction.

Accordingly, the drive transmission mechanism having the coiled springs 12a and 12b with no space or play relative to the surface forming the engaging groove 22 of the second rotational member 20 in the rotational direction, prevents any rotational delay from occurring between the first and second rotational members 30 and 20.

Here, it is to be noted that when the coiled springs 12a and 12b of the first embodiment mentioned above are mounted between the first and second rotational members 30 and 20 with the circular parts 14 and 14 of the pair of coiled springs 12a and 12b being oriented in the same direction and being overlapped to each other, it is not possible to see the mounting condition of the coiled springs 12a and 12b from outside. It is not preferable to mount the pair of coiled springs 12a and 12b therebetween in this way, because the maximum torque transmitted between the first and second rotational members 30 and 20 varies, depending upon its rotational direction.

Figure 10:
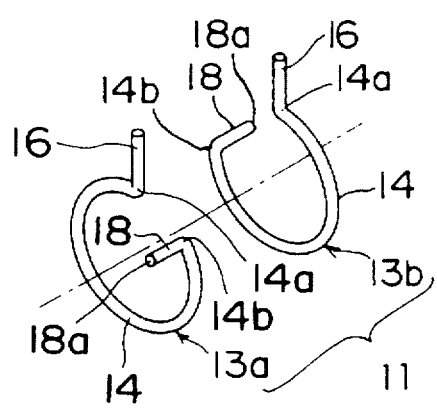
FIG. 10 is an exploded perspective view of a sliding joint, which is constituted by a pair of coiled springs, according to a second embodiment of the present invention.
Figure 11:
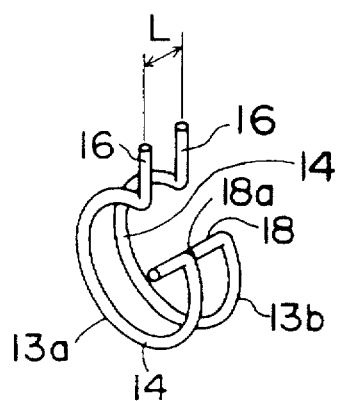
FIG. 11 is an explanatory view of the sliding joint of FIG. 10, showing one example that the pair of coiled springs are erroneously put together.
Figure 12:
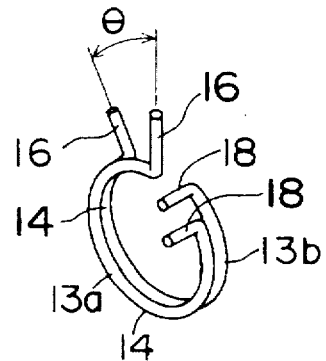
FIG. 12 is an explanatory view similar to FIG. 11, showing another example that the pair of coiled springs are erroneously put together.

Next, referring to FIGS. 10 through 12, the description is made on a drive transmission mechanism, according to the second embodiment thereof, which makes it possible to prevent such a mismounting as mentioned above of the pair of coiled springs.

The sliding joint 11 of the second embodiment comprises a pair of coiled springs 13a and 13b which have the same shape and configuration to each other, as shown in FIG. 10. Each coiled spring 13a or 13b is made of a one-piece type of spring material just like the coiled spring 12a or 12b of the first embodiment, and has a circular part 14 and a first projecting part 16 extending from an end 14a of the circular part 14 in a radially outward direction, just like the coiled spring 12a or 12b according to the first embodiment. However, different from the first embodiment, each coiled spring 13a or 13b has a second projecting part 18 which extends in the axial direction from the other end 14b of the circular part 14 of the coiled spring 13a or 13b.

The pair of coiled springs 13a and 13b are mounted between the first and second rotational members 30 and 20 in the same way as the first embodiment, with the pair of first projecting parts 16 and 16 being overlapped or contacted to each other, with the pair of circular parts 14 thereof being also overlapped to each other, and with the pair of second projecting parts 18 and 18 extending in opposite, outward directions generally parallel to the axial direction of the first or second rotational members 30 or 20.

According to the construction of the coiled springs 13a and 13b, they are prevented from being erroneously mounted between the first and second rotational members 30 and 20.

Namely, when the coiled springs 13a and 13b are overlapped with the same orientation, and a tip 18 of the second projecting part 18 of one coiled spring 13a or 13b contacts the circular part 14 of the other coiled spring 13b or 13a, the projecting parts 16 and 16 of the coiled springs 13a and 13b are separate from each other with an interval L in the axial direction, as shown in FIG. 11. The arrangement of the coiled springs 13a and 13b makes it impossible to properly mount them between the first and second rotational members 30 and 20, thus preventing the above mismounting of the coiled springs 13a and 13b between the first and second rotational members 30 and 20.

Also, when the circular parts 14 and 14 of the coiled springs 13a and 13b are overlapped with the same orientation, the first projecting parts 16 and 16 of the coiled springs 13a and 13b are not overlapped to each other with an angle θ formed therebetween. The arrangement of the coiled springs 13a and 13b also makes it impossible to properly mount them between the first and second rotational members 30 and 20, thus preventing the above mismounting of the coiled springs 13a and 13b therebetween.

Consequently, if the two coiled springs 13a and 13b are arranged in an erroneous direction relative to each other, it is not possible to properly mount them between the first and second rotational members 30 and 20 because the two projecting parts 16 and 16 of the coiled springs 13a and 13b are not engaged with the engaging groove 22 of the second rotational member 20 at the same time.

The first and second embodiments are the examples in which the projecting part 16 of the coiled spring 12a, 12b, 13a or 13b extends radially outwardly. Alternatively, the drive transmission mechanism may be so constructed that the projecting part of the coiled spring extends radially inwardly. Next, referring to FIGS. 13 and 14, the description is made on a drive transmission mechanism having such a sliding joint according to the third embodiment.

Figure 13:
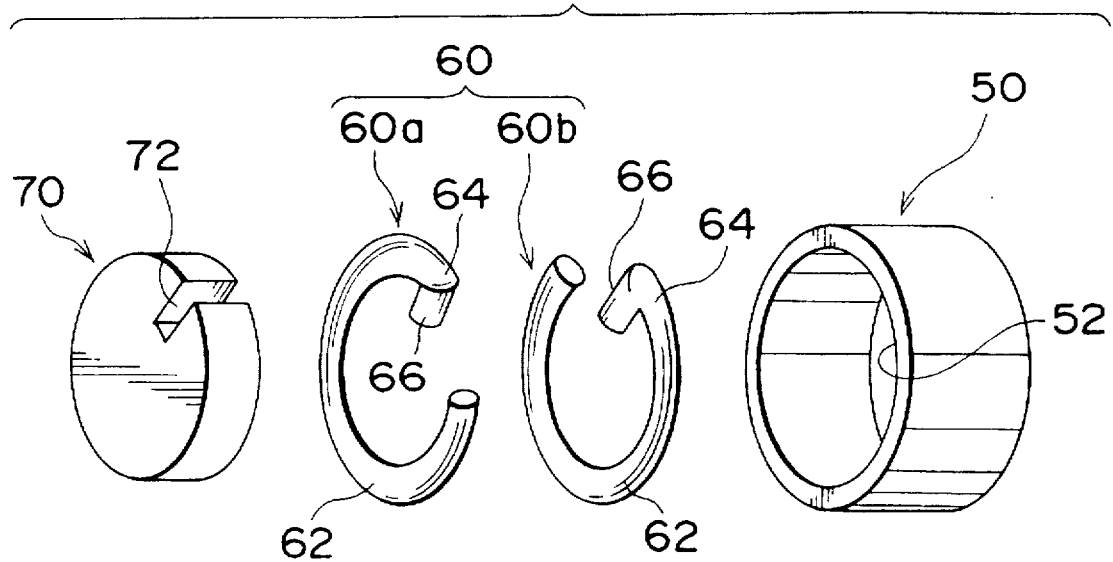
FIG. 13 is an exploded perspective view of a drive transmission mechanism having a sliding joint, which is constituted by a pair of coiled springs, according to a third embodiment of the present invention.

FIG. 13 is an exploded, perspective view of the drive transmission mechanism according to the third embodiment. The transmission mechanism comprises a first rotational member 50 with an inner opening 52, a sliding joint 60 that is comprised of a pair of coiled springs 60a and 60b each of which has an outer diameter a bit greater than an inner diameter of the first rotational member 50, and a second rotational member 70 which has an outer diameter smaller than an inner diameter of each coiled spring 60a or 60b.

Different from the first and second embodiments, each coiled spring 60a or 60b of the third embodiment has a projecting part 66 which extends radially inwardly from an end 64 of a circular part 62 thereof, as shown in FIG. 13.

The second rotational member 70 has an engaging groove 72 which receives the projecting parts 66 and 66 of the coiled springs 60a and 60b for engaging or locking the projecting parts 66 and 66 thereof with respect to the engaging groove 72 of the second rotational member 70. The projecting parts 66 of the coiled springs 60a and 60b, and the engaging groove 72 of the second rotational member 70, are mutually arranged so that there exists no play or no space between each projecting part 66 or 66 of the coiled spring 60a or 60b and a surface forming the engaging groove 72 of the second rotational member 70 in the rotational direction of the drive transmission mechanism.

Figure 14:
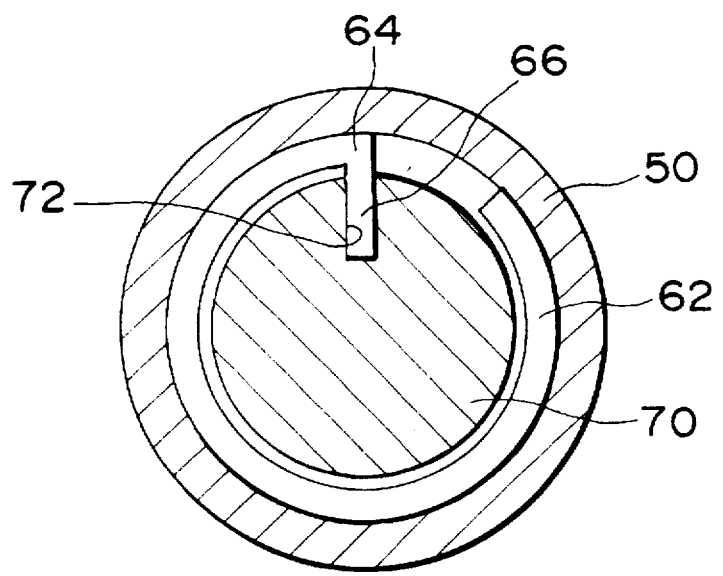
FIG. 14 is a transversely sectional, enlarged view of the drive transmission mechanism of FIG. 13 with parts thereof being assembled together.
Figure 15:
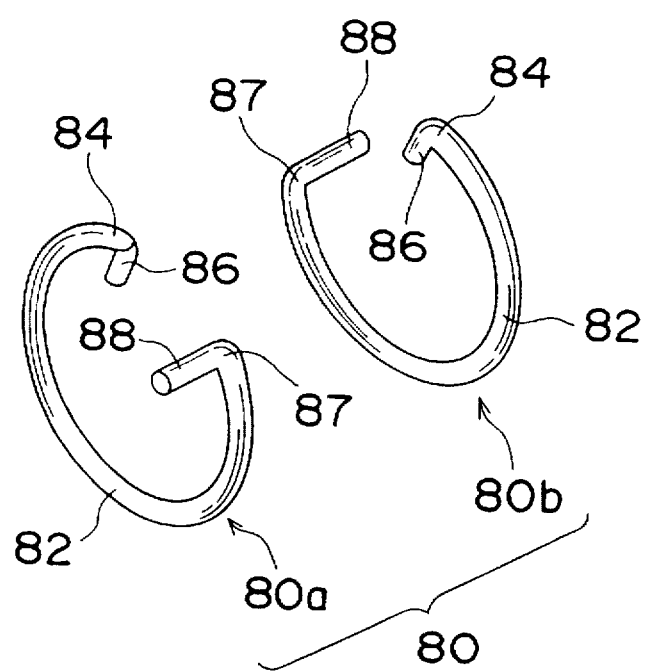
FIG. 15 is an exploded perspective view of a sliding joint, which is constituted by a pair of coiled springs, according to a modification to the sliding joint of FIG. 13.

The two coiled springs 60a and 60b are mounted between the first and second rotational members 50 and 70, in the same manner as described in the first embodiment, with the circular parts 62 of the coiled springs 60a and 60b being reversely orientated and being overlapped to each other. The arrangement made when the parts 50, 60a, 60b and 70 are assembled together is shown in FIG. 14 as a transverse sectional view of the mechanism.

As a modification to the third embodiment, the sliding joint 80 may have a pair of coiled springs 80a and 80b each of which has a circular part 82, a first projecting part 86 which projects radially and inwardly from an end 84 of the circular part 82, and a second projecting part 88 which projects in a direction generally parallel to the axes of the first and second rotational members 50 and 70, in order to prevent a mismounting of the pair of coiled springs between the two rotational members 50 and 70, like the second embodiment of the present invention.

In comparison with the first and second embodiments, the fundamental construction, effect and operation of the third embodiment are the same as ones of the first and second embodiments, except for the fictionally sliding or engaging region between the first rotational member 50 and the coiled springs 60a and 60b.

That is, in the construction of the first and second embodiments, the outer surface of the first rotational member and the inner surface of the coiled spring are engaged with each other; meanwhile, in the construction of the third embodiment, the inner surface of the first rotational member and the outer surface of the coiled spring are engaged with each other.

Although the present invention has been fully described in connection with the preferred embodiments thereof with reference to the accompanying drawings, it is to be noted that various changes and modifications are apparent to those skilled in the art.

For example, although the coiled springs of the above embodiments have more than a half of one complete winding and less than the one complete winding, the coiled springs may have a plurality of windings in order to transmit greater torque between the first and second rotational members.

Also, for example, the drive transmission mechanism may be so constructed that the number of windings of one coiled spring is different from the number of windings of the other coiled spring, or that the diameter of winding(s) of one coiled spring is different from the diameter of winding(s) of the other coiled spring. With the constructions, the biasing force of one coiled spring against the rotational member can be different from the biasing force of the other spring against it, thus, possible to change the transmission torque, depending upon the rotational direction of the drive transmission mechanism.

Also, for example, the drive transmission mechanism having the sliding joint according to the first through third embodiments may apply to other parts in the drive transmission system of the camera, although the sliding joint of the above embodiments apply to the motor shaft and the worm driven by the motor shaft in the mechanism.

Such changes and modifications are also to be understood as included within the scope of the present invention as defined by the appended claims unless they depart therefrom.

What is claimed is:

1. A drive transmission mechanism, comprising:

a first rotational member;

a first coiled spring which has a generally spiral winding part and a first engaging part which extends radially and outwardly from an end of the spiral winding part, wherein the spiral winding part of the first coiled spring is fictionally mounted on an outer surface of the first rotational member;

a second coiled spring which has a generally spiral winding part and a second engaging part which extends radially and outwardly from an end of the spiral winding part, wherein the spiral winding part of the second coiled spring is fictionally mounted on the outer surface of the first rotational member so that a winding direction of the spiral winding part of the second coiled spring is opposite to a winding direction of the spiral winding part of the first coiled spring; and a second rotational member which is coaxial to the first rotational member, and which has an engaging groove that receives the first engaging part of the first coiled spring and the second engaging part of the second coiled spring with no space, between the first and second engaging parts thereof, and a surface forming the engaging groove, in a rotational direction of the first and second rotational members.

2. A drive transmission mechanism as claimed in claim 1, the coiled spring has a projecting part which extends from the other end of the spiral winding part thereof in a direction generally parallel to an axis of the rotational member.

3. A drive transmission mechanism as claimed in claim 1, the spiral winding part of the coiled spring is generally in a form of a partial circle that is more than a half of one complete circle and is less than the one complete circle.

4. A drive transmission mechanism as claimed in claim 1, which is provided in a lens driving mechanism of a camera.

5. A drive transmission mechanism, comprising:

a first rotational member;

a first coiled spring which has a generally spiral winding part and a first engaging part which extends radially and inwardly from an end of the spiral winding part, wherein the spiral winding part of the first coiled spring is fictionally mounted on an inner surface of the first rotational member;

a second coiled spring which has a generally spiral winding part and a second engaging part which extends radially and inwardly from an end of the spiral winding part, wherein the spiral winding part of the second coiled spring is fictionally mounted on the inner surface of the first rotational member so that a winding direction of the spiral winding part of the second coiled spring is opposite to a winding direction of the spiral winding part of the first coiled spring; and a second rotational member which is coaxial to the first rotational member, and which has an engaging groove that receives the first engaging part of the first coiled spring and the second engaging part of the second coiled spring with no space, between the first and second engaging parts thereof, and a surface forming the engaging groove, in a rotational direction of the first and second rotational members.

6. A drive transmission mechanism as claimed in claim 5, the coiled spring has a projecting part which extends from the other end of the spiral winding part thereof in a direction generally parallel to an axis of the rotational member.

7. A drive transmission mechanism as claimed in claim 5, the spiral winding part of the coiled spring is generally in a form of a partial circle that is more than a half of one complete circle and is less than the one complete circle.

8. A drive transmission mechanism as claimed in claim 5, which is provided in a lens driving mechanism of a camera.

* * * * *